US012296450B2

(12) United States Patent
Gupte

(10) Patent No.: US 12,296,450 B2
(45) Date of Patent: May 13, 2025

(54) ADJUSTABLE PLIERS

(71) Applicant: Snap-on Incorporated, Kenosha, WI (US)

(72) Inventor: Anup A. Gupte, Buffalo Grove, IL (US)

(73) Assignee: Snap-on Incorporated, Kenosha, WI (US)

( * ) Notice: Subject to any disclaimer, the term of this patent is extended or adjusted under 35 U.S.C. 154(b) by 173 days.

(21) Appl. No.: 16/558,476

(22) Filed: Sep. 3, 2019

(65) Prior Publication Data

US 2021/0060735 A1 Mar. 4, 2021

(51) Int. Cl.
*B25B 7/04* (2006.01)
*B25B 7/10* (2006.01)

(52) U.S. Cl.
CPC . *B25B 7/10* (2013.01); *B25B 7/04* (2013.01)

(58) Field of Classification Search
CPC .... B25B 7/02; B25B 7/04; B25B 7/08; B25B 7/10; B25B 7/12; B25B 7/123; B25B 7/14; B25B 7/16; B25B 13/50; A45D 29/02
See application file for complete search history.

(56) References Cited

U.S. PATENT DOCUMENTS 159,229 A 1/1875 Stouffer
444,923 A 1/1891 Spery
478,600 A * 7/1892 Haworth .................. B25B 7/10 81/409
1,408,524 A 3/1922 Long
1,800,447 A 4/1931 Froeschl
1,891,865 A * 12/1932 Gustaf ...................... B25B 7/10 81/407
1,950,362 A * 3/1934 Manning .................. B25B 7/10 81/414
2,558,440 A 6/1951 Johnson
2,592,927 A * 4/1952 Manning .................. B25B 7/10 81/414
2,640,381 A * 6/1953 Manning .................. B25B 7/10 81/414
2,640,398 A 6/1953 Manning
2,882,775 A * 4/1959 Rank ......................... B25B 7/10 81/414

(Continued)

FOREIGN PATENT DOCUMENTS

CN 101502956 A 8/2009
CN 104690660 A 6/2015

(Continued)

OTHER PUBLICATIONS

Combined Search and Examination Report for Application No. GB2012537.3 dated Jan. 28, 2021, 9 pages.

(Continued)

*Primary Examiner* — Robert J Scruggs
(74) *Attorney, Agent, or Firm* — Taft Stettinius & Hollister LLP

(57) ABSTRACT

Pliers with receiving surfaces formed in the handles of the pliers so as to increase the contact surface area between the pliers and the work piece. The pliers grip the work piece at the jaws of the pliers and at the receiving surfaces to increase the contact area between the tool and the work piece as compared to conventional adjustable pliers.

15 Claims, 10 Drawing Sheets

(56) References Cited

U.S. PATENT DOCUMENTS

| | | | | | |
|---|---|---|---|---|---|
| 3,161,094 | A * | 12/1964 | Johnson | B25B 7/10 81/412 |
| 3,192,805 | A | 7/1965 | Manning | |
| 3,322,009 | A | 5/1967 | Rydell | |
| 3,534,641 | A | 10/1970 | LeDuc | |
| 3,739,664 | A * | 6/1973 | Swanstrom, Jr. | B21K 5/00 72/376 |
| 3,878,741 | A | 4/1975 | Wilson | |
| 3,964,352 | A | 6/1976 | Dukes | |
| 4,318,292 | A * | 3/1982 | Beilke | B25B 7/00 76/119 |
| 4,438,669 | A * | 3/1984 | Hastings | B25B 13/22 81/409.5 |
| 4,603,607 | A * | 8/1986 | Schaffner, Jr. | B25B 7/10 81/414 |
| 4,893,528 | A | 1/1990 | Chung-Hsing | |
| 4,901,609 | A | 2/1990 | Crum | |
| 4,920,593 | A * | 5/1990 | Finn | B25F 1/003 81/319 |
| 5,134,908 | A * | 8/1992 | Fisher | B25B 7/10 81/414 |
| 5,960,683 | A | 10/1999 | Malkin et al. | |
| 7,044,033 | B2 | 5/2006 | Hirse | |
| 7,089,832 | B2 * | 8/2006 | Engvall | B25B 7/10 81/391 |
| 7,681,477 | B2 | 3/2010 | Alexander | |
| 8,695,464 | B2 | 4/2014 | Herrmann | |
| 2002/0083803 | A1 * | 7/2002 | Ping | B25B 7/10 81/394 |
| 2004/0016325 | A1 | 1/2004 | Smith | |
| 2006/0213337 | A1 | 9/2006 | Schuh | |
| 2010/0064861 | A1 | 3/2010 | Herrmann | |
| 2017/0361427 | A1 | 12/2017 | Wang | |
| 2018/0021925 | A1 | 1/2018 | Bridges et al. | |
| 2018/0281156 | A1 * | 10/2018 | Chen | B25B 7/10 |

FOREIGN PATENT DOCUMENTS

| | | | | |
|---|---|---|---|---|
| CN | 205148117 | U | 4/2016 | |
| CN | 207402676 | U | 5/2018 | |
| CN | 108422343 | A | 8/2018 | |
| DE | 102006059807 | | 6/2008 | |
| JP | 2001252880 | A | 9/2001 | |
| TW | 201706079 | A | 2/2017 | |
| TW | 201908065 | A | 3/2019 | |
| WO | 2014114145 | A1 | 7/2014 | |
| WO | WO-2018115171 | A2 * | 6/2018 | B25B 13/28 |
| WO | 2020139749 | A1 | 7/2020 | |

OTHER PUBLICATIONS

Australian Examination Report No. 1 for corresponding AU Application No. 2020217363 dated May 10, 2021, 5 pages.
Canadian Office Action for corresponding CA Application No. 3,091,361, dated Oct. 14, 2021, 4 pages.
United Kingdom Examination Report for corresponding UK Application No. GB2012537.3, dated Oct. 20, 2021, 5 pages.
Taiwan Office Action for corresponding TW Application No. 109129861, dated Nov. 15, 2021, 6 pages.
Chinese Office Action for corresponding CN Application No. 202010910790.2, dated Jan. 19, 2022, 9 pages.
United Kingdom Examination Report for corresponding UK Application No. GB2112861.6, dated Jan. 21, 2022, 6 pages.
United Kingdom Examination Report for corresponding UK Application No. GB2012537.3, dated Feb. 28, 2022, 5 pages.
Examination Report for corresponding Application No. GB2112861.6 dated Jul. 6, 2022, 4 pages.
Office Action for corresponding Application No. 202010910790.2 dated Jul. 12, 2022, 9 pages.
Office Action for corresponding Application No. 3,091,361 dated Jul. 25, 2022, 4 pages.
Chinese Office Action for corresponding Application No. 2020109107902 dated Dec. 20, 2022, 11 pages.
Mac Tools, Slip-Joint Tongue and Groove Pliers 9-1/2, product No. M420G (accessed on Jul. 26, 2023) retrieved from the internet: https://www.mactools.com/products/m420g.
Matco Tools, 16" Giant Plier W/Grips, part No. 460G (accessed on Jul. 26, 2023) retrieved from the internet: https://www.matcotools.com/catalog/product/460g/16-giant-plier-w-grips.
Matco Tools, 16" Groove Joint Pliers, part No. PGJ16B (accessed on Jul. 26, 2023) retrieved from the internet: https://www.matcotools.com/catalog/product/pgj16b/16-groove-joint-pliers.
Channellock, 460 16.5-Inch Straight Jaw Tongue & Groove Pliers, part No. 460 (accessed on Jul. 26, 2023) retrieved from the internet: https://channellock.com/product/460/.
Channellock, 420 9.5-Inch Straight Jaw Tongue & Groove Pliers, part No. 420, (accessed on Jul. 26, 2023) retrieved from the internet: https://channellock.com/product/420/.
Snap-On, 9" Adjustable Joint Interlocking Channel Pliers (Red), part No. 91ACP (accessed on Jul. 26, 2023) retrieved from the internet: https://shop.snapon.com/product/Standard-(Adjustable-Joint)/9%22-Adjustable-Joint-Interlocking-Channel-Pliers-(Red)/91ACP.

* cited by examiner

ADJUSTABLE PLIERS

TECHNICAL FIELD OF THE INVENTION

The present invention relates generally to pliers. More particularly, the present invention relates to adjustable pliers having increased contact surface area between the jaws of the pliers and a work piece.

BACKGROUND OF THE INVENTION

Pliers are a common hand tool used to rotate work pieces. Many different types of pliers exist, including locking pliers, needle nose pliers, and adjustable pliers. As shown in FIG. 10, a conventional adjustable pliers 1000 include a first handle 1005 and a second handle 1010 pivotally movable relative to each other. The first handle 1005 leads to a first jaw 1015 and the second handle 1010 leads to a second jaw 1020, wherein the first and second jaws 1015, 1020 cooperatively form a jaw gripping area that is adapted to grip a work piece. The second handle 1010 includes a slot 1025 through which a pin 1030 can be inserted to allow the first handle 1005 to pivot about the second handle 1010.

As shown, conventional adjustable pliers 1000 grip work pieces with teeth located on the first and second jaws 1015, 1020 of the pliers. This provides two gripping surfaces between the pliers and the work piece and a contact surface area equal to, at most, the area of the teeth on the first and second jaws 1015, 1020. Compressive gripping forces from the pliers 1000 is transmitted to the work piece through the contact area between the pliers and work piece. For this reason, additional contact surface area between the pliers and the work piece would be advantageous to more efficiently apply compressive gripping forces from the pliers to the work piece. This additional contact surface area subsequently minimizes wear on fasteners as well as reduces wear on the plier gripping areas.

SUMMARY OF THE INVENTION

The present invention broadly comprises pliers with enhanced contact surface area between the pliers jaw and a work piece. For example, the tool can include receiving surfaces defined within the handles of the tool to increase the number of surfaces that are adapted to contact the work piece and therefore increase the contact surface area between the pliers and the work piece to maximize the pliers' grip on the work piece.

For example, the present invention broadly comprises pliers for applying compressive gripping forces to a work piece having a work piece shape, for example, and without limitation, a hex head bolt. The pliers include a first handle, a first jaw extending from the first handle and having first jaw teeth, a second handle pivotally coupled to the first handle, a second jaw extending from the second handle and having second jaw teeth, a pin pivotably coupling the first and second handles at an adjustment slot, wherein the pin is adapted to be selectively movable within the slot to adjust a gap distance between the first and second jaws, a first receiving surface defined within the first handle and extending at a first angle relative to the first jaw teeth, and a second receiving surface defined within the second handle and extending at a second angle relative to the second jaw teeth. The first and second receiving surfaces and first and second jaw teeth, cooperatively defines a shape that substantially corresponds to the exterior shape of a work piece, and at least a portion of the first receiving surface, second receiving surface, first jaw teeth, and second jaw teeth contact the work piece during use to maximize grip of the pliers against the work piece.

The present invention also broadly comprises pliers for applying compressive gripping forces to a work piece with a work piece shape. The pliers include first and second handles respectively extending to first and second jaws respectively having first and second teeth substantially parallel to one another, the second handle including a slot disposed therein. The pliers can further include a pin extending through the slot and dimensioned to be selectively movable within the slot to adjust a gap between the first and second jaws, a first receiving surface defined within the first handle, the first receiving surface extending at a first angle to the first jaw teeth, and a second receiving surface defined within the second handle, the second receiving surface extending at a second angle to the second jaw teeth. The first and second receiving surfaces and the first and second jaw cooperatively define a shape that corresponds to the exterior shape of the work piece, and wherein at least a portion of the first and second receiving surfaces and first and second jaw teeth are adapted to contact the exterior surface of the work piece during use.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
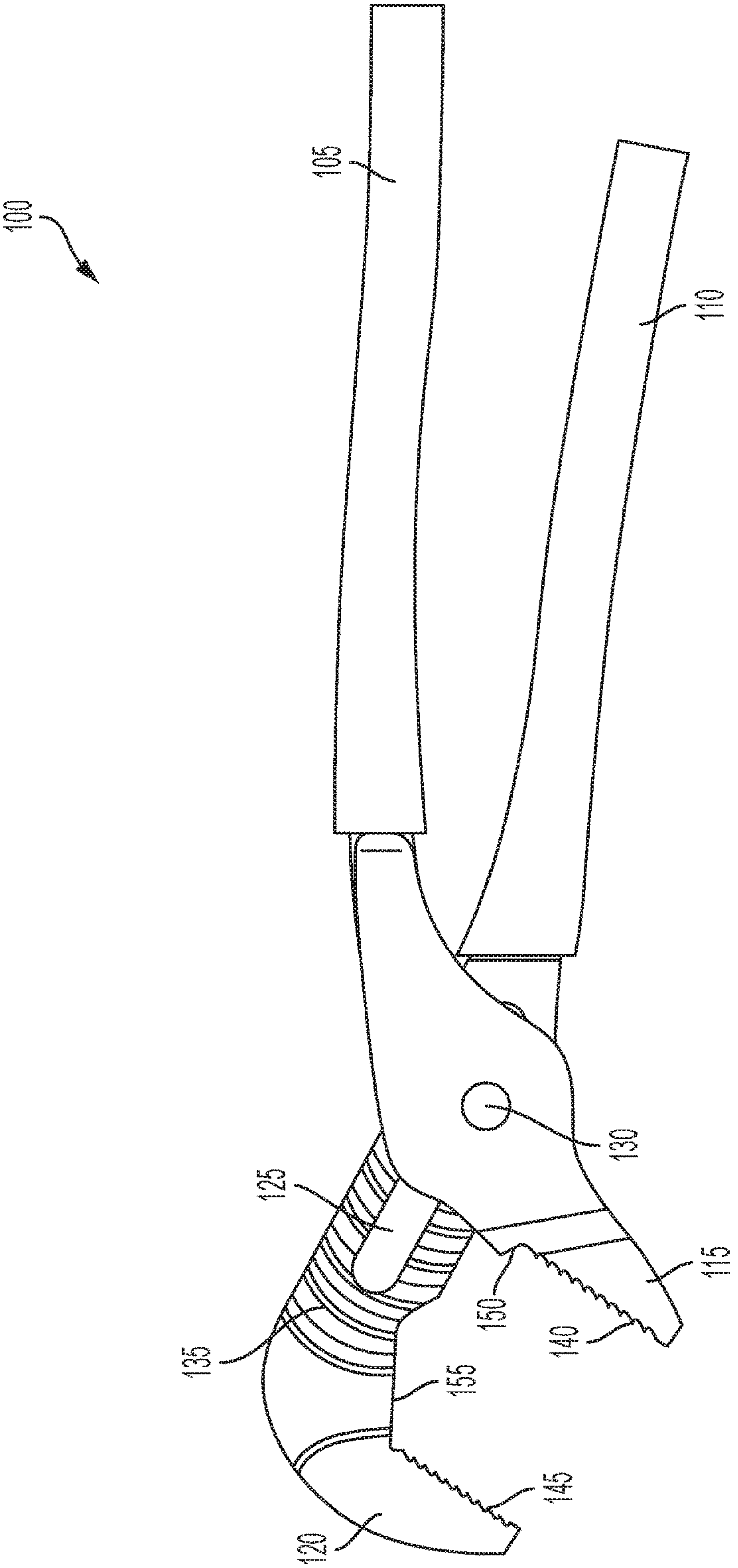
FIG. 1 is a side view of pliers according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises pliers with receiving surfaces formed in the handles of the pliers that are cooperatively adapted to increase the contact surface area between the pliers and a work piece. The receiving surfaces can cooperatively grip the work piece with increased contact surface area between the pliers and work piece, compared to conventional pliers that are adapted to only contact the work piece at the jaws.

Figure 2:
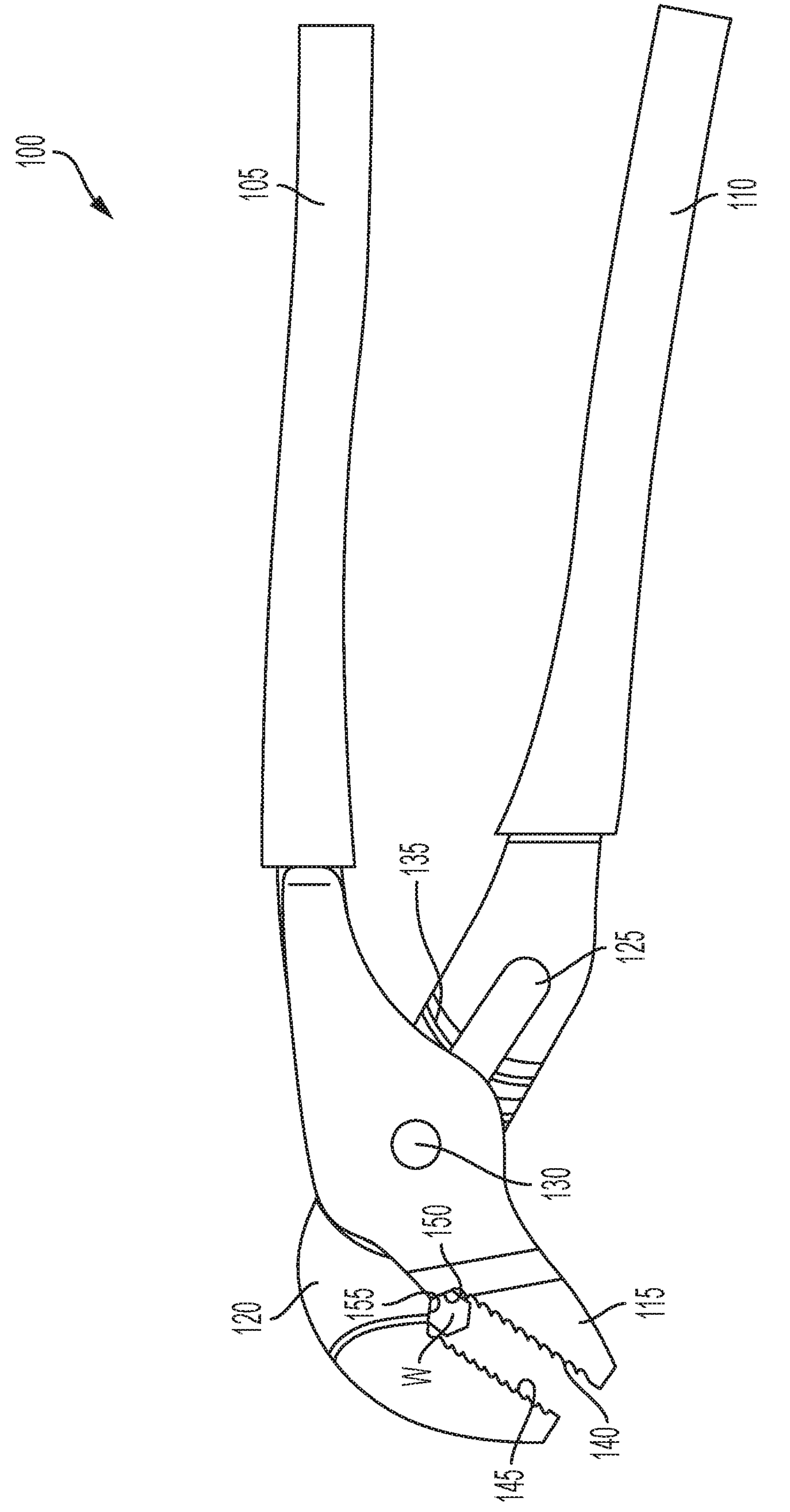
FIG. 2 is a side view of pliers with an example smaller work piece gripped by the jaws according to an embodiment of the present invention.
Figure 3:
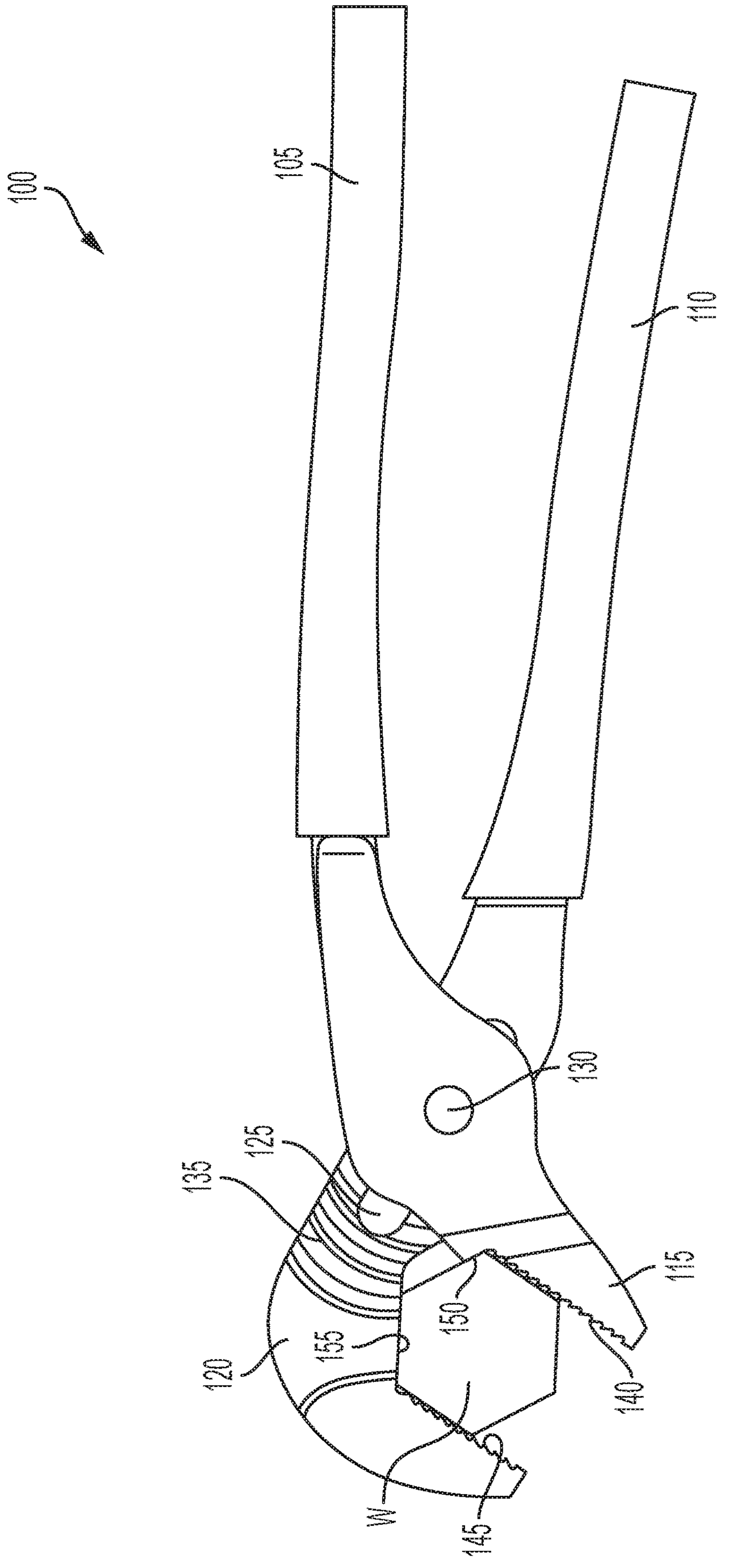
FIG. 3 is a side view of pliers with an example larger work piece gripped by the jaws according to an embodiment of the present invention.

Referring to FIGS. 1-3, a tool 100 can include a first handle 105 and a second handle 110 coupled together in a pivotal manner. The first handle 105 can lead to a first jaw 115 and the second handle 110 can lead to a second jaw 120. The second handle 110 can have a slot 125 disposed therein that is adapted to receive a pivot pin 130 coupled to the first handle 105 and allow a pivotal movement between the first handle 105 and second handle 110. The first 105 and second 110 handles can be further coupled together with an adjustment mechanism 135 that resists pivotal movement of the first handle 105 about the second handle 110 when engaged. The adjustment mechanism 135 can include offset teeth of both handles 105, 110 meshingly engaging one another, as described below in more detail.

The head of the tool 100 can have various components that are adapted to grip a work piece during use to apply compressive gripping forces to the work piece. For example, the first jaw 115 can include first teeth 140 and the second jaw 120 can include second teeth 145 that are adapted to grip the work piece in a conventional manner. However, the first handle 105 can also include a first receiving surface 150 formed within the first handle 105 and that provides an additional contact surface for gripping the work piece and applying compressive gripping forces to the work piece. Similarly, the second handle 110 can include a second receiving surface 155 that can grip the work piece during use. By providing additional contact surfaces, the tool 100 can contact the work piece with more surface area and more efficiently apply compressive gripping force from the tool 100 to the work piece.

Figure 4:
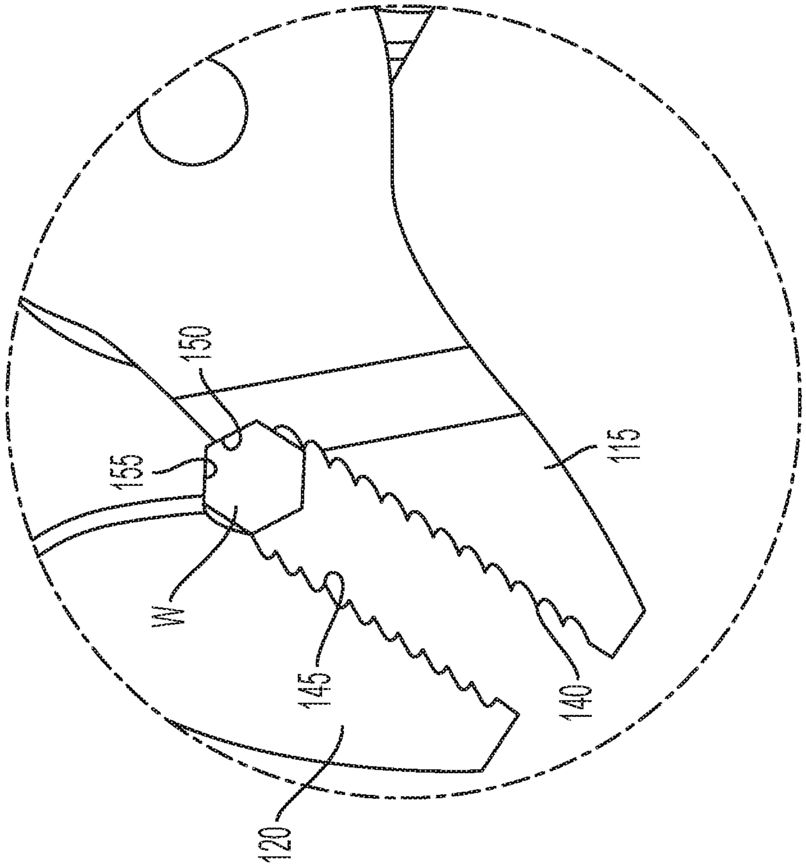
FIG. 4 is an enlarged partial side view of pliers gripping an example smaller hexagonal work piece according to an embodiment of the present invention.
Figure 5:
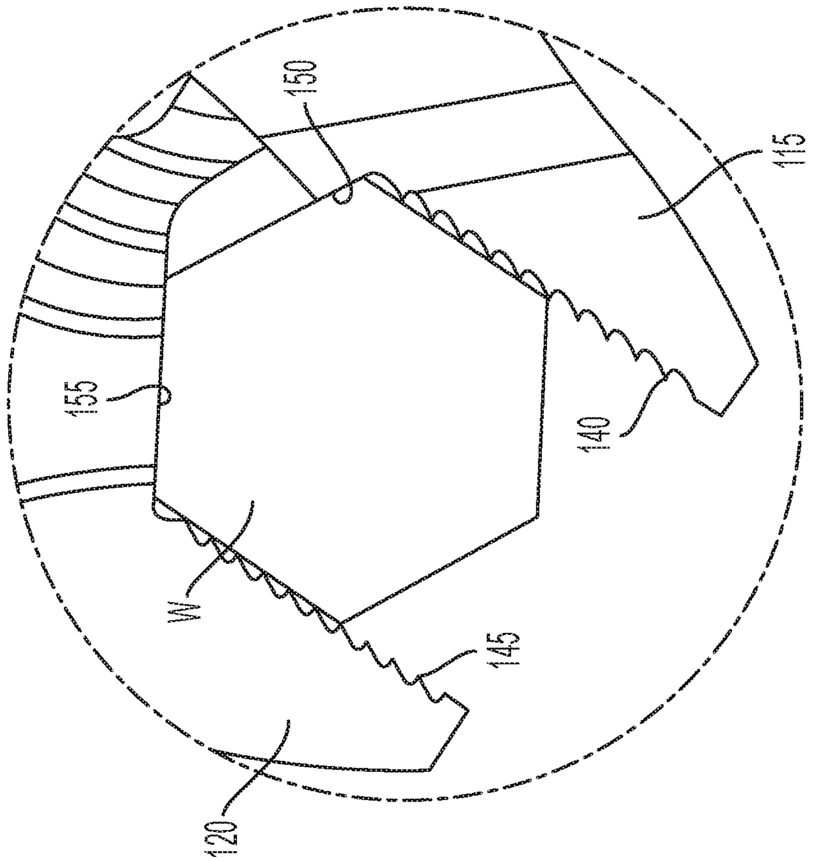
FIG. 5 is an enlarged partial side view of pliers gripping an example larger hexagonal work piece according to an embodiment of the present invention.

The first receiving surface 150 can be angled at about 60 degree angle relative to the teeth 140 of the first jaw 115 and, similarly, the second receiving surface 155 can be angled at an angle of about 60 degrees relative to the teeth 145 of the second jaw 120. In this manner, and as shown in FIGS. 2 and 3, the teeth 140, 145 and receiving surfaces 150, 155 can cooperatively grip, for example, a hexagonally shaped work piece W, such as, for example, a hex head bolt or nut, with additional surface area and therefore with improved efficiency, compared to conventional pliers, which only grip the work piece W with the teeth 140, 145. For example, the same tool 100 can grip a smaller hexagonal work piece W, as shown in FIGS. 2 and 4; and also grip a larger hexagonal work piece W, as shown in FIGS. 3 and 5.

Figure 6:
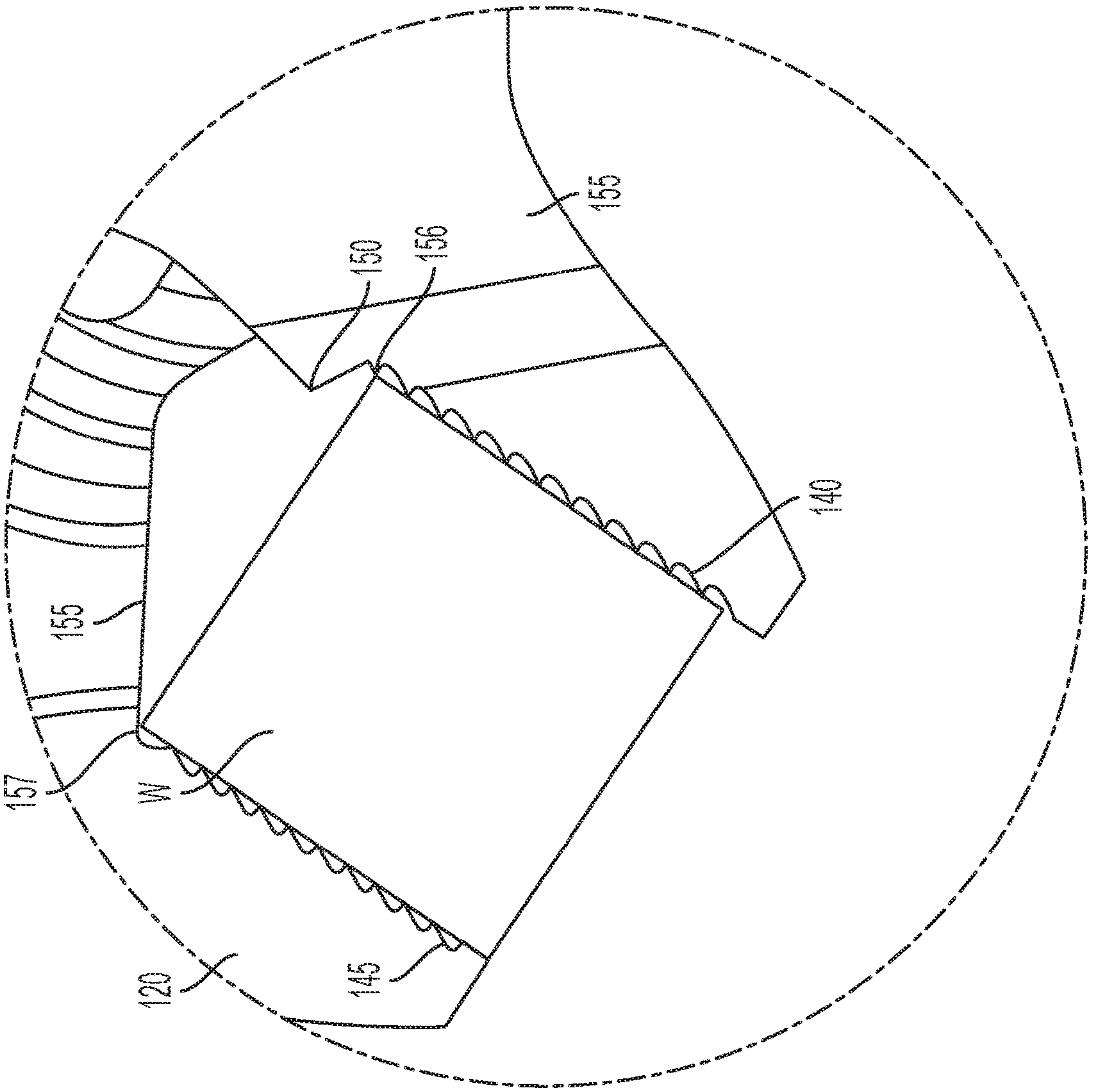
FIG. 6 is an enlarged partial side view of pliers gripping an example square work piece according to an embodiment of the present invention.
Figure 7:
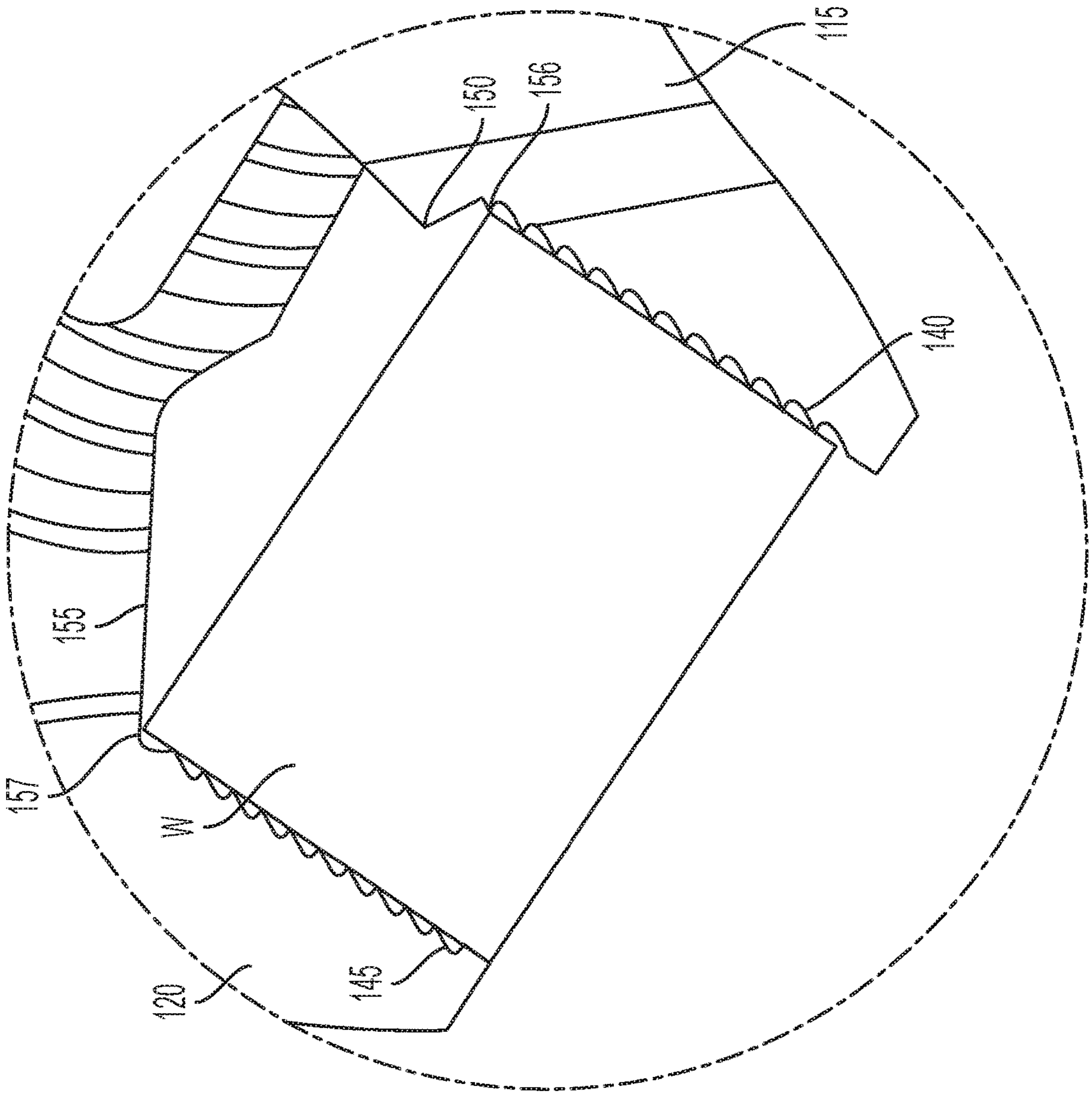
FIG. 7 is an enlarged partial side view of pliers gripping an example rectangular work piece according to an embodiment of the present invention.

The tool 100 can further grip square or rectangular work pieces in an improved manner, as shown in FIGS. 6 and 7, respectively. For example, as shown in FIG. 6, the teeth 140, 145 of the jaws 115, 120 directly contact the work piece W during use. However, the tool 100 can include a first corner 156 intersecting the first teeth 140 and the first receiving surface 150, and a second corner 157 intersecting the second teeth 145 and the second receiving surface 155. These corners 156, 157 provide additional contact areas with the work piece W during the application of compressive gripping forces. In particular, the corners 156, 157 also contact the work piece W and reduce the chances of the work piece W slipping about the teeth 140, 145, which a rotational force is applied to the tool.

Figure 8:
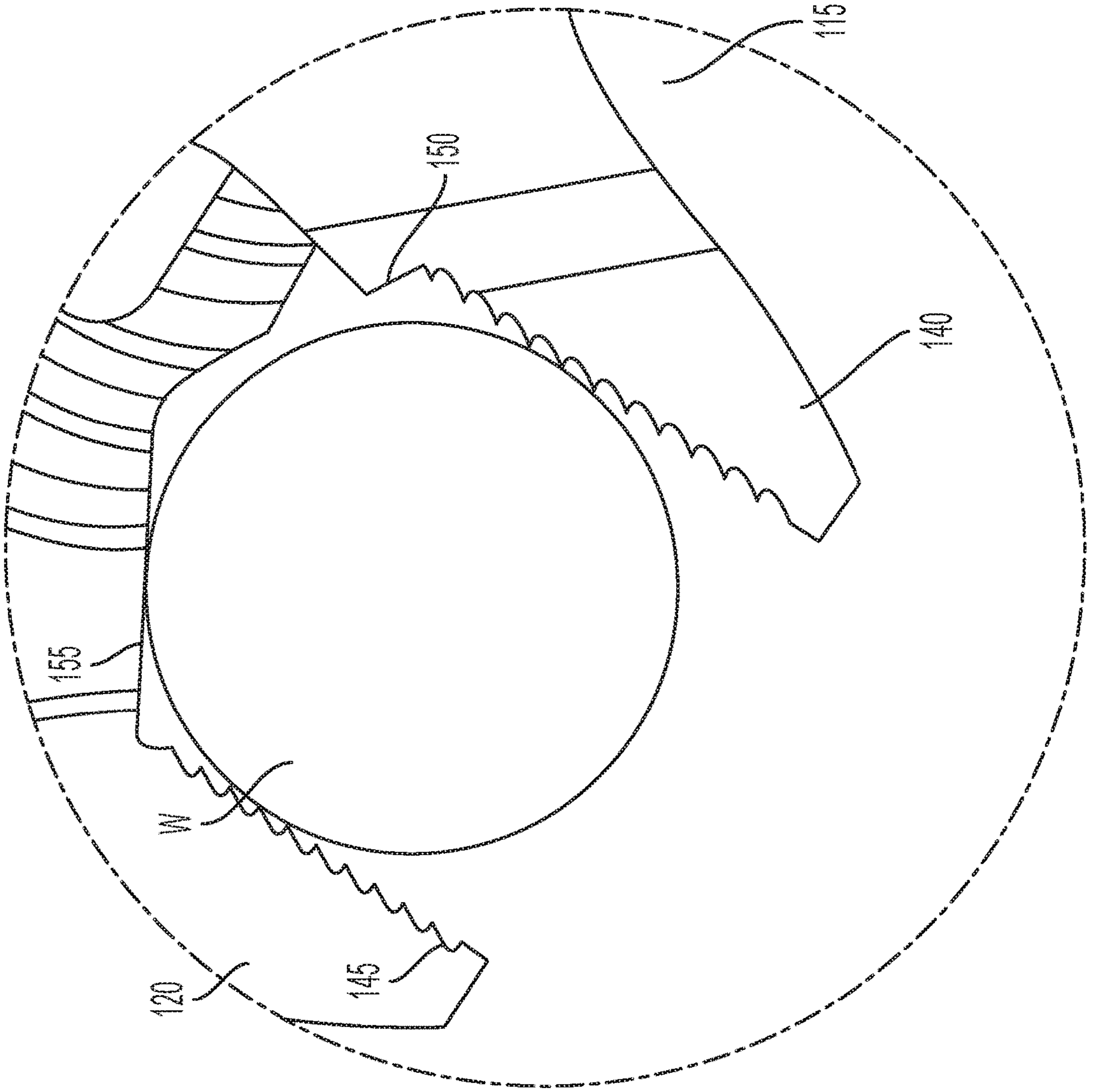
FIG. 8 is an enlarged partial side view of pliers gripping an example circular work piece according to an embodiment of the present invention.

Referring to FIG. 8, the tool 100 can also be advantageously be used on circular shaped work pieces W. For example, and as shown, the tool 100 can grip circular shaped work piece W with the teeth 140, 145, as with conventional pliers. The tool 100 can also contact the circular work piece W at the receiving surfaces 150, 155, despite the receiving surfaces 150, 155 not forming a shape entirely complementary to the circular shape of the work piece W. As shown, the receiving surfaces 150, 155 can be tangent to the work piece W and grip the work piece W at the contact points between the receiving surfaces 150, 155 and work piece W.

Figure 9:
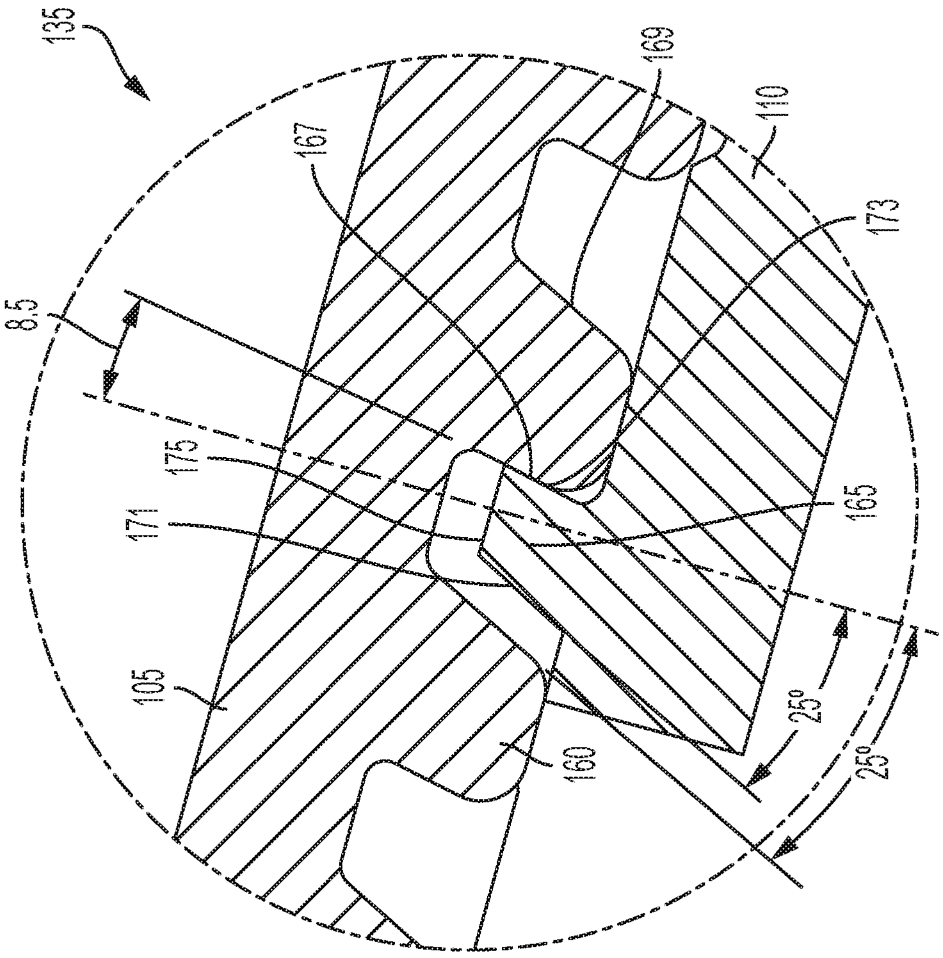
FIG. 9 is an enlarged partial sectional view of an adjustment mechanism according to an embodiment of the present invention.
Figure 10:
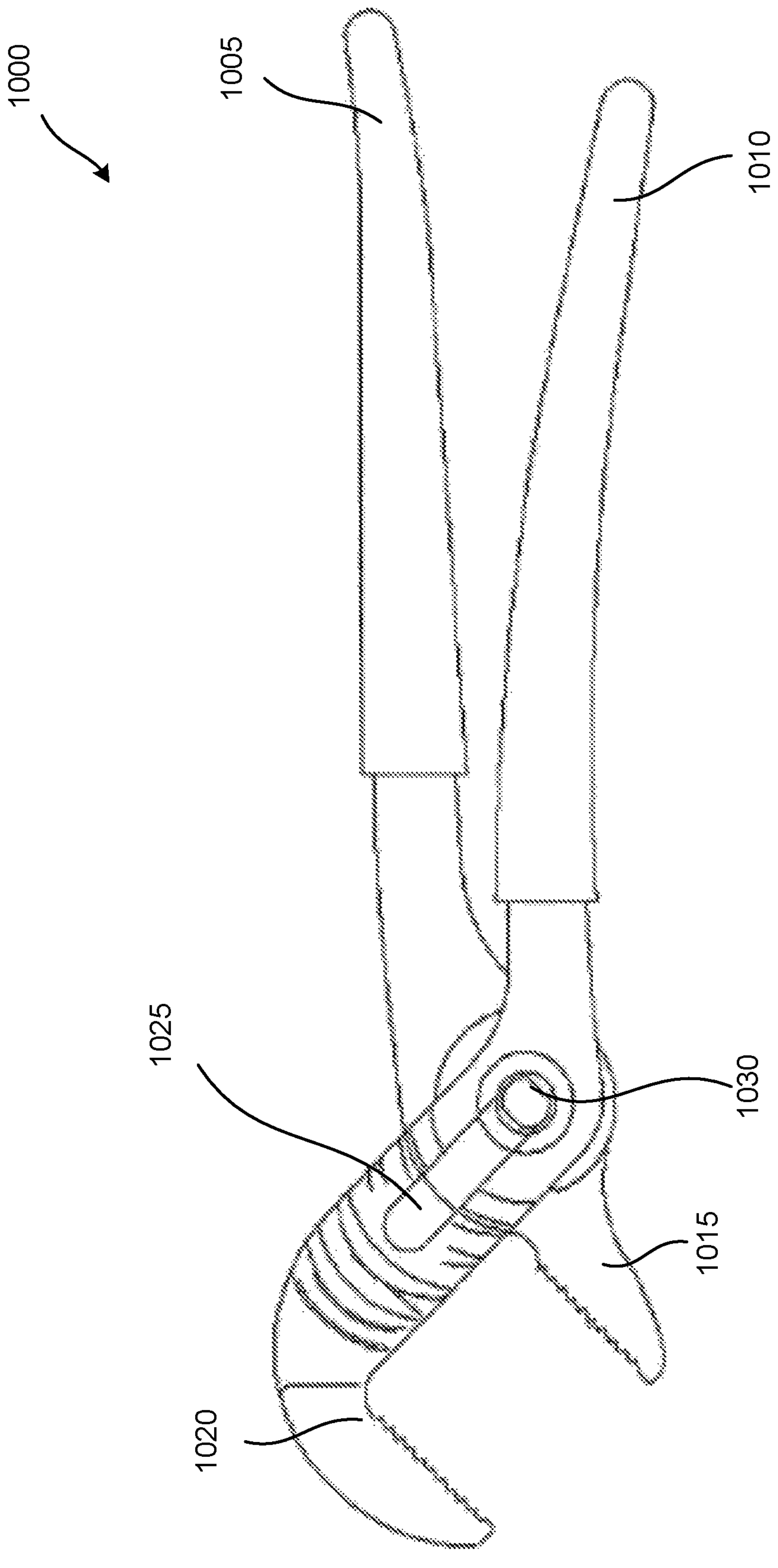
FIG. 10 PRIOR ART
FIG. 10 is a side view of a prior art pliers.

FIG. 9 illustrates an adjustment mechanism 135 according to an embodiment of the present invention. As shown, the adjustment mechanism 135 can include first adjustment teeth 160 associated with the first handle 105, and second adjustment teeth 165 associated with the second handle 110. The adjustment teeth 160, 165 can be generally parallel to one another and can meshingly engage the first handle 105 with the second handle 110 for releasable coupling of the first 105 and second 110 handles. The adjustment teeth 160, 165 can further be angled relative to a handle direction in which the first 105 and second 110 handles extend. For example, the first adjustment teeth can have first leading faces 167 and first trailing faces 169, and the second adjustment teeth 165 can have second leading faces 171 and second trailing faces 173. The first leading face 167 and the second trailing face 173 can extend at a non-normal angle to a handle direction about which the first 105 and second 110 handles extend. For example, the first leading face 167 and the second trailing face 173 can extend at an angle that is about 8.5 degrees to an angle normal to the handle direction. Similarly, the first trailing face 169 and the second leading face 171 can extend at an angle that is about 25 degrees to an angle normal to the handle direction. With this undercut, the adjustment mechanism 135 has been found to form a better grip between the first 105 and second 110 handles, compared to other angular orientations of conventional adjustment teeth.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. Pliers adapted to engage a work piece, the pliers comprising:

a first plier half including a first handle, and a first jaw extending from the first handle and including first jaw teeth;

a second plier half including a second handle, and a second jaw extending from the second handle and including second jaw teeth, wherein the first and second jaws cooperatively define a gap therebetween;

a pin pivotably coupling the first and second plier halves together at a slot, the pin adapted to be selectively movable within the slot to adjust the gap;

an adjustment mechanism disposed adjacent to the slot and including adjustment teeth;

a first receiving surface defined within the first handle and having a first receiving surface length, the first receiving surface is substantially straight and extends substantially from the first jaw teeth at a first angle relative to a plane extending along the first jaw teeth; and a second receiving surface defined within the second handle and having a second receiving surface length that is greater than the first receiving surface length, wherein the second receiving surface is substantially straight, extends substantially from the second jaw teeth at a second angle of about 60 degrees relative to a plane extending along the second jaw teeth, and at least a portion of the second receiving surface intersects at least one of the adjustment teeth.

2. The pliers of claim 1, wherein the first and second angles are equal.

3. The pliers of claim 1, wherein the first and second angles are each about 60 degrees.

4. The pliers of claim 1, wherein the adjustment teeth include first adjustment teeth disposed on the first handle, and second adjustment teeth disposed on the second handle, and the second adjustment teeth are meshingly engageable with the first adjustment teeth for releasably coupling the first and second handles together.

5. The pliers of claim 4, wherein the first adjustment teeth respectively include first leading faces and first trailing faces, and the second adjustment teeth respectively include second leading faces and second trailing faces, and the first leading face and the second trailing face respectively extend at an angle that is about 8.5 degrees to an angle normal to the first and second handles.

6. The pliers of claim 4, wherein the first adjustment teeth respectively include first leading faces and first trailing faces, and the second adjustment teeth respectively include second leading faces and second trailing faces, and wherein the second leading faces and the first trailing faces respectively extend at an angle that is about 25 degrees to an angle normal to the first and second handles.

7. The pliers of claim 1, wherein the first jaw teeth intersect the first receiving surface at a first corner, and the second jaw teeth intersect the second receiving surface at a second corner, wherein the first and second comers are adapted to contact the work piece during use.

8. Pliers adapted to engage a work piece, comprising:

first and second handles respectively extending to first and second jaws cooperatively defining a gap therebetween, the first and second jaws respectively having first and second jaw teeth, the second handle including a slot;

a pin extending through the slot and dimensioned to be selectively movable within the slot to adjust the gap;

first adjustment teeth disposed on the first handle and including first leading faces and first trailing faces;

second adjustment teeth disposed on the second handle and including second leading faces and second trailing faces, wherein the second adjustment teeth are meshingly engageable with the first adjustment teeth, the first and second adjustment teeth form an adjustment mechanism, and the first leading faces and the second trailing faces respectively extend at an angle that is about 8.5 degrees to an angle normal to the first and second handles;

a first receiving surface defined within the first handle and having a first receiving surface length, the first receiving surface is substantially straight and extends substantially from the first jaw teeth at a first angle relative to a plane extending along the first jaw teeth; and a second receiving surface defined within the second handle and having a second receiving surface length that is greater than the first receiving surface length, wherein the second receiving surface is substantially straight, extends substantially from the second jaw teeth at a second angle of about 60 degrees relative to a plane extending along the second jaw teeth, and at least a portion of the second receiving surface intersects at least one of the second adjustment teeth.

9. The pliers of claim 8, wherein the first and second angles are equal.

10. The pliers of claim 8, wherein the first and second angles are each about 60 degrees.

11. The pliers of claim 8, wherein the second leading faces and the first trailing faces respectively extend at an angle that is about 25 degrees to an angle normal to the first and second handles.

12. The pliers of claim 8, wherein the first jaw teeth intersect the first receiving surface at a first corner, and the second jaw teeth intersect the second receiving surface at a second corner, the first and second corners adapted to contact a work piece during use.

13. Pliers having a first handle pivotably coupled to a second handle at a slot of the second handle, the first and second handles respectively extending to first and second jaws cooperatively defining a gap therebetween, the first and second jaws respectively having first and second jaw teeth, the pliers comprising:

first adjustment teeth formed into and extending from a first side surface of the first handle towards the second handle;

second adjustment teeth formed into and extending from a second side surface of the second handle towards the first handle and meshingly engageable with the first adjustment teeth for releasable coupling of the first and second handles, wherein the first and second side surfaces face each other;

wherein the first adjustment teeth respectively include first leading and trailing faces that respectively extend at first leading and first trailing non-normal angles with respect to a first handle direction in which the first handle extends, and the second adjustment teeth respectively include second leading and trailing faces that respectively extend at second leading and second trailing non-normal angles with respect to a second handle direction in which the second handle extends, and wherein the first leading and second trailing non-normal angles are about 8.5 degrees, a first receiving surface defined within the first handle and extending substantially from the first jaw teeth at a first angle; and a second receiving surface defined within the second handle and extending substantially from the second jaw teeth at a second angle of about 60 degrees, and wherein at least a portion of the second receiving surface intersects at least one of the second adjustment teeth.

14. The pliers of claim 13, wherein the first trailing and second leading non-normal angles are equal.

15. The pliers of claim 13, wherein the first trailing and second leading non-normal angles are about 25 degrees.

* * * * *